United States Patent [19]
Morris et al.

[11] Patent Number: 6,063,849
[45] Date of Patent: *May 16, 2000

[54] ZINC OXIDE PHOTOACTIVE MATERIAL

[75] Inventors: Robert S. Morris, Fairhaven; Myles A. Walsh, IV, East Falmouth, both of Mass.

[73] Assignee: Cape Cod Research, Inc., East Falmouth, Mass.

[*] Notice: This patent is subject to a terminal disclaimer.

[21] Appl. No.: 09/280,194

[22] Filed: Mar. 29, 1999

Related U.S. Application Data

[63] Continuation of application No. 08/715,105, Sep. 18, 1996, Pat. No. 5,916,947, which is a continuation-in-part of application No. 08/551,231, Nov. 1, 1995, abandoned, which is a continuation-in-part of application No. 08/348,467, Dec. 2, 1994, abandoned.

[51] Int. Cl.$^7$ ..................................................... C08K 3/22
[52] U.S. Cl. ............................................ 524/432; 523/122
[58] Field of Search ............................... 524/432, 99, 88, 524/87, 413; 106/18.32, 18.34, 18.36; 523/122, 124, 125

[56] References Cited

U.S. PATENT DOCUMENTS

| | | | |
|---|---|---|---|
| 2,091,633 | 8/1937 | Frishkorn et al. | 524/432 |
| 2,275,584 | 3/1942 | Catlow et al. | 524/432 |
| 2,390,408 | 12/1945 | Young | 106/18.31 |
| 2,769,716 | 11/1956 | Rankin . | |
| 2,818,344 | 12/1957 | Buckman . | |
| 2,885,298 | 5/1959 | Eastman | 106/309 |
| 2,901,447 | 8/1959 | Lox | 524/432 |
| 3,093,603 | 6/1963 | Gilchrist | 106/18 |
| 3,266,922 | 8/1966 | Cummings et al. | 524/432 |
| 3,331,806 | 7/1967 | Fior et al. | 524/432 |
| 3,507,676 | 4/1970 | McMahon . | |
| 3,528,842 | 9/1970 | Skadulis . | |
| 3,598,627 | 8/1971 | Klimboff . | |
| 3,679,626 | 7/1972 | Tanekusa et al. . | |
| 3,801,534 | 4/1974 | Beers . | |
| 3,825,627 | 7/1974 | McGaugh . | |
| 3,826,825 | 7/1974 | Dowd et al. . | |
| 3,888,684 | 6/1975 | Little . | |
| 3,945,834 | 3/1976 | Clarke et al. . | |
| 4,012,503 | 3/1977 | Freiman . | |
| 4,121,025 | 10/1978 | Scott . | |
| 4,139,515 | 2/1979 | Dennington . | |
| 4,161,526 | 7/1979 | Gorman | 424/263 |
| 4,249,953 | 2/1981 | Keifer et al. | 524/424 |
| 4,360,606 | 11/1982 | Tobias et al. . | |
| 4,394,477 | 7/1983 | Screeton . | |
| 4,439,555 | 3/1984 | Doi et al. . | |
| 4,440,611 | 4/1984 | Dhar et al. . | |
| 4,513,029 | 4/1985 | Sakai . | |
| 4,596,864 | 6/1986 | Trotz et al. . | |
| 5,049,592 | 9/1991 | Kronstein . | |
| 5,098,473 | 3/1992 | Hani et al. . | |
| 5,112,397 | 5/1992 | Former et al. . | |
| 5,116,611 | 5/1992 | Masuoka et al. . | |
| 5,147,686 | 9/1992 | Ichimura et al. . | |
| 5,266,105 | 11/1993 | Tsureta et al. . | |
| 5,342,437 | 8/1994 | Gavin et al. . | |
| 5,352,725 | 10/1994 | Palmer et al. . | |
| 5,441,726 | 8/1995 | Mitchnick et al. . | |
| 5,562,995 | 10/1996 | Kappock . | |
| 5,916,947 | 6/1999 | Morris et al. | 524/432 |

OTHER PUBLICATIONS

Preuss, Harold P. "Pain Additives"—pp 186–199 (Noxes Data Corp. 1970).

Seymour, Raymond B. "Additives for Plastics"—pp 233–248 (Academic Press 1978).

Ross, Neil W. "The Regulation of Antifouling Paint"—pp 74–76 (Trade Only 1994).

Iyoda, Tomokazu et al "Two Photon . . . Azulene"—pp 169–175, Photo electrochemisty and Electrosynthesis on Semiconducting mat'ls, Electrochem. Cal Socty. Proceedings, vol. 88–14 (1988).

Hochandani, Serat et al "Photoelectrochemistry . . . ," J. Electrochem. Soc., vol. 139 No. 6 pp 1630–33 (1992).

Anonymous "Why Use No Foul"—E. Paint Co. (Aug. 1994).

Anonymous "Antifouling Bottom Treatments —Round 4", Practical Sailor, pp 5–10 (Apr. 1995).

Mc Lellan, H.J. Elements of Phy.

Savin, S. B. "Infuence of Zinc oxide on Paint molds," Ind. and Eng. Chemistry, vol. 36, No. 4, pp 336–40 (Apr. 1944).

W. A. Waters : "Mechanisms of Oxidation of Organic Compounds," 7–14 (1964).

*Primary Examiner*—Veronica P. Hoke
*Attorney, Agent, or Firm*—Lorusso & Loud; Anthony M. Lorusso

[57] ABSTRACT

A non-toxic, antifouling coating composition is provided which comprises zinc oxide contacted with photosensitizer (s) which increase the capability of zinc oxide to absorb visible light.

17 Claims, No Drawings

6,063,849

ZINC OXIDE PHOTOACTIVE MATERIAL

CROSS-REFERENCE TO RELATED APPLICATIONS

This application is a continuation application of application Ser. No. 08/715,105 filed Sep. 18, 1996 now U.S. Pat. No. 5,916,947 which is a continuation-in-part of application Ser. No. 08/551,231 filed Nov. 1, 1995, now abandoned, which is a continuation-in-part of application Ser. No. 08/348,467 filed on Dec. 2, 1994, now abandoned.

FIELD OF THE INVENTION

The invention relates to particles for incorporation into substrates for imparting antifouling effects. The particles are particularly useful as coating compositions comprising at least 20% by weight photoactive zinc oxide and less than about 5% by weight photosensitizer(s). These compositions are useful for coating equipment submerged in natural waters, for example, fish nets, water conduits and boat hulls, but also find use in protecting and preserving surfaces in the air subjected to fouling, for example, shower curtains, hospital walls, toilet bowls, roofs, and masonry.

BACKGROUND OF THE INVENTION

Heretofore, the most successful antifouling coatings have comprised a relatively inert organic binder with a biocidal pigment which is leached from the paint. Zinc oxide has been used in the past in antifouling coating compositions as a white pigment, to impart flexibility and hardness to the coating and/or as an insolubilizing agent. Zinc oxide is not recognized as useful as a primary toxicant, probably because it is only sparingly soluble in neutral water. Thus, while heretofore zinc oxide has been widely used in antifouling coatings, its role is as a supporting compound to recognized biocidal agents.

Previously it was thought that coating compositions containing zinc oxide levels higher than 20 wt % greatly reduced the antifouling properties and life of the coating unless small levels of a very toxic material were also included. This is because higher levels imply replacing the primary toxicant with zinc oxide and the effectiveness of the coating was believed to be directly related to the level of the primary toxicant in the coating. Levels higher than 20 wt % have in the past been limited to coating compositions containing extremely toxic triorganotin moieties where only relatively small amounts of primary toxicant are necessary. (See, for example, U.S. Pat. No. 4,139,515 (Dennington) issued Feb. 13, 1959.)

Heretofore, ultraviolet light has been used to sterilize surfaces. However, the solution to the problem of using visible light to render surfaces toxic to pestiferous organisms has not been known in the art. A solution to the problem would be highly desired since visible light is more commonly available than is ultraviolet light and is a nontoxic, renewable resource.

Use of visible light to produce phototoxic surfaces would be especially useful for coatings on fish nets and boat bottoms. Equipment submerged in natural waters at depths of more than one meter only receives significant amounts of light energy in the blue-green region of the electromagnetic spectrum at around 500 nm. Thus a phototoxic surface which utilizes blue and green light would be highly desired by boat owners and aquaculturists to name a few.

This invention relates to utilizing visible light to photochemically synthesize an effective concentration of hydrogen peroxide by in situ reduction of oxygen on zinc oxide. It is known that photolysis of aqueous, aerated solutions containing zinc oxide pigment leads to the formation of hydrogen peroxide only when exposed to ultraviolet light of wavelengths greater than 400 nm and thus has been thought to be ineffective for producing phototoxic surfaces.

Hydrogen peroxide is a known toxicant but prior methods for generating hydrogen peroxide on surfaces are inefficient and expensive. Such techniques have included applying cathodic voltage and current to a conducting or semiconducting surface to produce at or near the surface an effective concentration of hydrogen peroxide.

The very success of toxic antifouling coatings based on biocidal pigment leaching has led to their over use. This has so polluted the environment that lead, mercury, and triorganotin based coatings are now banned in most parts of the world. Copper-based paints are still permitted, but they are classified as pesticides needing strict government controls for testing and use.

The leaching of soluble copper salts into navigable waters from pleasure craft, nuclear power plants, and the like is of great concern to State and Federal Authorities especially in areas of high concentrations of polluting sources. Present antifouling paints are a major cause of such concern. Copper-based paints now must exhibit limited release rates of copper to a point where for many applications they are ineffective.

Heretofore, toxic antifouling coatings relied entirely on the leaching into the environment of poisons contained within the coating. Over time, even the best heretofore available antifouling coating loses its toxicant and becomes ineffective.

SUMMARY OF THE INVENTION

Accordingly, the present invention comprises a new type of antifouling coating composition which provides excellent antifouling effects without the aforesaid problem of environmental pollution and is capable of protecting surfaces from biofouling for a length of time approximating the useful life of the surfacing. Consequently, the antifouling coating compositions are quite free from any antifouling agent causing environmental pollution and exhibit an excellent antifouling effect against a broad range of fouling organisms for long periods of time.

Specifically, the invention is a particle mixture in powder or slurry form which exhibits antifouling properties when incorporated into a carrier comprising: zinc oxide, said zinc oxide containing less than about 0.001% by weight of lead, cadmium and sulfur oxides and being obtained from colloidal ZnO and having a mean particle size of from about 0.10 to about 0.50 microns and a surface area from about 1 to about 10 square meters/gram and being in photoelectric proximity to a photosensitizer, said photosensitizer having a solubility below 5 ppm by weight in water and being able to absorb visible light and catalyze the production of peroxides when in contact with ZnO, water, $O_2$ and visible light.

By design and purpose, antifouling coatings are toxic to life. Paint authorities world-wide are unanimous that for any antifouling paint to work, it must contain a leachable toxic component. The investigations of the present inventors have led to the surprising discovery that a paint composition comprising a binder and about 20 to about 60 wt % of said composition of suspended zinc oxide pigment and less than about 5 wt % of photosensitizer(s) shows an excellent and unsuggested antifouling effect against fouling organisms for long periods of time despite the omission of the leachable toxic component generally recognized as a primary antifouling agent.

No exact mechanism by which this unexpected and surprising result is obtained has been elucidated, but as experimentally shown in the Examples given hereinbelow, the compositions of this invention are new types of antifouling compositions which do not cause environmental pollution.

It is possible that the coated surface, which results after application, drying and aging of the compositions of the invention, is very hostile to the attachment of juvenile plants and animals due to more than one mechanism. The present inventors have found that, especially in the presence of humid air or on immersion in aerated water, surfaces coated by the compositions of the invention and subjected to terrestrial sunlight become rich in peroxides. Peroxides are known biocides and powerful oxidants. Oxidation of the coated surface may result in organic acids which dissolve zinc oxide and complex with the resulting zinc ions to produce a toxic surface. Furthermore, especially when exposed to direct natural sunlight, the compositions of the invention utilizing organic binders slowly chalk with time. This exposes fresh zinc oxide which may help maintain the antifouling properties of the coating for years.

Zinc oxide pigments of high purity reflect visible light and absorb no photoenergy at wavelengths above about 350 nm. Surprisingly the energy from visible light can be absorbed according to this invention by contacting the surface of the zinc oxide with one or more peroxide-generating photosensitizer(s). According to this invention, these are limited to material(s) which absorb visible light with wavelengths between about 400 nm and about 700 nm, and, when contacted by said light, water, zinc oxide and oxygen, cause the photosynthesis of effective concentrations of hydrogen peroxide.

The suitability of all and any material to provide the phototoxic surface of this invention is determined by contacting said material with zinc oxide, water, oxygen and visible light and measuring the concentration of peroxide ions in said water with respect to time. Preferred materials are those wherein the peroxide concentration of the lighted test solution continues to increase with time to levels in excess of about 1.0 ppm.

Apparatus for measuring the concentration of peroxide ions are well known as are methods for measuring the ability of material to absorb visible light. Those skilled in the art will appreciate that photochemical efficiency for absorbing visible light and photosynthesizing peroxide ions on zinc oxide is maximized by selecting materials which (a) are chemically stable in the presence of oxygen, visible light and water, (b) have highly absorbing chromophores within the visible solar spectrum, and (c) have moderately high electrical conductivity so that efficient electron transfer from the light-absorbing material to the conduction band of zinc oxide is possible.

Preferred photosensitizers are substantially insoluble in water (solubility below 0.5 part per million by weight), absorb visible light, and catalyze the production of peroxides when contacted with zinc oxide, water, oxygen and visible light.

All materials at some concentration are harmful to life. However, according to this invention, preferred photosensitizers are those whose levels of use in the invention are generally regarded as safe and which are specifically permitted for use in antifouling coatings by the U. S. Environmental Protection Agency.

For long coating life, photosensitizers which are chemically stable under oxidizing conditions are especially preferred.

Certain photosensitizers will produce antifouling coatings without any zinc oxide present. By way of example, but not by way of limitation, limited antifouling results are achieved using compositions containing about 5 wt % of the yellow photosensitizer zinc pyrithione without any zinc oxide present. However, the investigations of the present inventors have surprisingly found that the mixture does much more than the sum of the components and that very much lower levels of photosensitizers are needed to produce very much more useful antifouling effects. The photosensitizers of this invention may cost about ten to many thousand times more per pound than zinc oxide. Thus, when coating cost is an object, the preferred antifouling compositions of this invention comprise zinc oxide pigment in the amount of about 20 to about 60 wt % and levels of photosensitizer(s) below about 5 wt % of said antifouling paint composition.

By way of example, but not by way of limitation, photosensitizers according to this invention include inorganic pigments such as anatase or strontium titanate and organic pigments such as hypericin, azulene, zinc pyrithione, tetrakis-4-N-methylpyridyl, and porphyrinatozinc. Said photosensitizers in the dark exhibit low toxicity to life, are insoluble in water, and cause zinc oxide to become more photoactive in visible terrestrial light.

The wavelength of visible light absorbed depends primarily on the choice of photosensitizer. Thus, for example, azulene absorbs red light strongly with a maximum around 694 nm while anatase absorbs only in the blue. By admixing more than one photosensitizer into a composition of the invention, a larger fraction of the incident white light energy can be used to photoactivate zinc oxide. This is often desirable for indoor applications, for example, hospital walls and toilet bowls, where either the intensity of incident white light is low and/or where a very toxic surface coating is desired.

Zinc oxide pigments of high purity are photoactive. While zinc oxide and the various polymer-based binders that are used for example, in paints and coatings are, by themselves, relatively stable to sunlight, their mixtures often photodegrade, or "chalk". This photodegradation is commonly initiated by the absorption of ultraviolet light, but less damaging absorption of blue, green, yellow, orange and even red light can be achieved according to this invention by containing the surfaces of the zinc oxide with suitable photoactive pigments. Absorption of light is known to produce electron-hole pairs in semiconductors. In the presence of water, electrons can reduce oxygen to peroxide radicals:

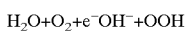

$H_2O+O_2+e^- \rightarrow OH^- + OOH$ and then to peroxide ions:

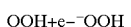

$OOH+e^- \rightarrow {^-}OOH$

Holes can directly oxidize many organic adsorbates including living cells. The surface exposed to light is thus oxidized in two ways: through direct oxidation by holes, and through oxidation by peroxides.

Various embodiments of the present invention provide a vehicle and zinc oxide as the principal pigment. The upper limit for the amount of zinc oxide is set by known choices of vehicle and method of application. Zinc oxide pigment levels of up to about 60 wt % represent compositions which are to be applied by brush and roller and which contain appreciable amounts of solvents or diluents as the means by which the composition may be applied. Compositions which are to be sprayed contain more vehicle and hence less zinc oxide pigment.

While useful antifouling effects are observed with commercial zinc oxide pigment in particle shapes from nodular, lamellar to coarse acicular and containing impurities in small amounts of metallic oxides and sulphur, superior antifouling particles are obtained from colloidal zinc oxide made from high-purity zinc metal under carefully controlled conditions so as to produce a mean particle size of about 0.10 to about 0.50 microns and surface area of about 1 to about 10 square meters/gram. Representative chemical properties are 99.6% zinc oxide containing less than about 0.001% of lead, cadmium and sulfur oxides. Said preferred zinc oxide pigment is commercially available as USP-1 or USP-2 grade zinc oxide from Zinc Corporation of America, Monaca, Pa.

Surprisingly, it has also been found that the antifouling effect may be greatly enhanced by including in the compositions according to this invention one or more photosensitizers. A photosensitizer is a substance that makes material reactive or sensitive to radiant energy, especially light. The photosensitizers of the present invention are narrowly chosen from this broad class specifically for their ability to make for example, dried surfaces that have been coated with the composition of the invention phototoxic when exposed to longwave ultraviolet and visible light. Said photosensitizers probably sensitize the wide-gap semiconductor zinc oxide, and, in doing so, permit the generation of holes and/or toxic oxides on said zinc oxide at conditions which are typical for many exposed surfaces. Surfaces exposed to indoor, outdoor and underwater conditions typically receive some solar radiation in the longwave ultraviolet and visible range of the spectrum and are typically also exposed to oxygen and water. This oxygen and water are believed to be the chemical source of the toxicant of this invention. Thus, unlike all known toxic surfaces, the invention produces toxicant from air and water and does not require an internal storehouse of toxicant to function for long periods of time.

In sum, photosensitizers according to this invention are pigments which can enhance the ability of the compositions of the invention to absorb energy from the terrestrial solar spectrum. Preferred photosensitizers are materials which, when contacted by zinc oxide and by visible light, cause zinc oxide to better absorb energy from visible light.

These and other aspects of the invention will become apparent upon reading the following detailed description of the invention.

DETAILED DESCRIPTION

Although the improved biocidal efficacy and environmental advantages associated with the present invention are expected to provide advantages when used in a wide variety of applications, e.g., paints, including indoor and outdoor household paints, industrial and commercial paints and, household cleaning products, particularly advantageous results are obtained when the compositions of the present invention are utilized in conjunction with marine paints, for example, on ship's hulls. In addition, the compositions of the present invention provide desirable results in the context of paints of all types including oil and water based types.

Typically, a paint composition will comprise a vehicle comprising a resin, one or more pigments, a suitable solvent for the resin, and various optional additives such as thickening agent(s), wetting agent(s), and the like, as is well-known in the art. The resin is preferably selected from the group consisting of vinyl, alkyl, epoxy, siloxane, polyurethane, acrylonitrile, acrylate, chlorinated elastomer type or polyester resins, and combinations thereof. For masonry exposed to the weather, a preferred vehicle comprises water and alkali silicates selected from the group consisting of sodium silicate, potassium silicate, quaternary ammonium silicate and ammonium silicate and their mixtures.

For environmental as well as safety reasons, it is very desirable to utilize water-based vehicles. While some desirable photosensitizers are commercially available as pigments dispersed in water, some are not. For those that are available as water-based dispersions, useful compositions according to this invention can be formulated by admixing said water-based dispersions directly with a water-based vehicle.

However, for photosensitizers that are available only as water-insoluble organic materials, a preformulation step is required which involves either subliming or solvent depositing the photosensitizer over the surfaces of the colloidal zinc oxide prior to suspending the zinc oxide pigment in the vehicle. Said step helps ensure that the photosensitizer contacts the zinc oxide and is used in economic amounts.

In addition, the paint compositions of the present invention optionally additionally contain additives which have a favorable influence on the viscosity, the wetting power and the dispersibility, as well as on the stability to freezing and electrolytes and on the foaming properties.

The compositions of the invention may be applied to the substrate to be protected by any of the conventional methods including dipping, spraying or brushing. The substrate should be clean and oil free. Bare metal surfaces should be primed prior to application.

The surprising technical advance achieved by the coating compositions according to the invention is apparent from the following examples which further explain but do not limit the invention.

EXAMPLE 1

A first coating composition according to the invention is formulated by mixing the ingredients:

| Ingredients: | Parts by Weight |
| --- | --- |
| Zinc Oxide, USP-1 | 39.0 |
| Solvent - Xylene | 18.1 |
| Solvent - Methyl Isobutyl Ketone | 19.6 |
| Gum Rosin, ww Grade | 10.0 |
| Vinyl Resin, VYHH | 6.2 |
| Plasticizer - Flexol LOE | 1.5 |
| Antisettling Agent - MPA 2000X | 0.6 |
| Thickening Agent - Fumed Silica | 0.4 |
| Photosensitizer | 3.0 |
| Pigment | 1.6 |
| TOTAL | 100.0 |

The vinyl resin (VYHH) and the plasticizer (Flexol LOE) are commercially available from Union Carbide Chemicals and Plastics Co., Danbury, Conn. 06817. The settling agent (MPA 2000X) is a product of N. L. Chemicals Inc., Hightstown, N.J. 08520. Said photosensitizers are chosen according to the invention for their insolubility in water, for their lack of broad toxicity, and especially for their ability to increase the absorption by zinc oxide of visible light energy. All are capable in the presence of oxygen, water and zinc oxide of producing oxidizing species including singlet oxygen, superoxide, hydroxyl radicals and peroxides. All of these short-lived species can oxidize cellular substrates and are thus capable of killing life. Photosensitizers tested were fumed anatase (Titanium Dioxide P-25, Degussa Corporation, Dublin Ohio 43017), bianthrone (Aldrich Chemical Co., Milwaukee, Wis. 53233), azulene (Aldrich Chemical Co., Milwaukee, Wis. 53233), zinc pyrithione (Olin Corp., Cheshire, Conn. 06410), terthiophene (99%, Aldrich Chemical Co., Milwaukee, Wis. 53233) and hypericin (95%, Sigma Chemical Co., St. Louis, Mo. 63178) separately and in mixtures.

The photosensitizers illustrated in the first coating do not posses broad spectrum toxicity to animal life. Anatase and bianthrone are considered biologically inert. Azulene is an irritant. Zinc pyrithione has limited toxicity for bacteria and fungus and is so safe An for humans that it is the principal ingredient in antidandruff shampoo. Terthiophene is the biocidal constituent of various species of marigolds. Hypericin derives its name from Hypericum, a genus of plants which probably biosynthesize the pigment to protect themselves from grazing animals. Both terthiophene and hypericin require sunlight, water and oxygen to exhibit toxicity. The pigments tested were phthalocyanine blue, phthalocyanine green, titanium dioxide (rutile) and carbon black which produce blue, green, white and gray coatings respectively.

A second coating composition according to the invention is formulated by mixing the ingredients:

| Ingredients: | Parts by Weight |
|---|---|
| Zinc Oxide, USP-1 | 25.4 |
| Wetting Resin, polyester-urethane dispersion | 24.0 |
| Water | 40.0 |
| Hydroxyethyl cellulose | .5 |
| Crosslinker, hexamethoxy methyl melamine | 6.4 |
| Wetting Agent, silicone surfactant | 1.5 |
| Dimethylethanolamine | .9 |
| Blocking Catalyst, p-TSA | .3 |
| Photosensitizer, P-25 anatase | 1.0 |
| TOTAL | 100.0 |

The photosensitizer (Titanium Dioxide P-25, Degussa Corporation, Dublin Ohio 43017), is nanocrystalline and developed for use in photochemical degradation of organic contaminants in water. This second coating composition illustrates a water-based formulation in the simplest form.

Said coating compositions were according to the invention painted over the primed surfaces of fiber-glass reinforced plastic sheets and these surfaces placed alongside uncoated control surfaces in the Atlantic Ocean, on the shady side of a roof of a building in New England and in a shower stall whose walls and curtain regularly foul with mildew. In all cases, after one year of exposure, the surfaces coated with said coating compositions were free of biological growth or staining while the control panels were covered with biological growth and very unsightly.

These results were totally unexpected since known zinc-containing compositions have very limited activity for preventing algal growth and no known activity underwater for preventing the attachment of barnacles, tube worms or sea squirts. None of the ingredients of the invention are recognized in prior art as having broad spectrum biological activity in the dark. Thus, EXAMPLE 1 shows unexpected and hitherto unrecognized effectiveness of the compositions of this invention comprising more than about 20 wt % zinc oxide and less than about 5 wt % photosensitizer.

EXAMPLE 2

In order to attempt to elucidate the exact mechanism(s) for the remarkable and long-lived antifouling behavior of surfaces coated with this invention, a number of control experiments were performed.

Compositions containing less than 20 wt % zinc oxide pigment and about 35 wt % metallic zinc dust were suspended in a solvent-based vehicle containing a vinyl resin binder, painted onto fiberglass surfaces, allowed to air dry, and then immersed in the Atlantic Ocean during the summer months. After 30 days of immersion, these compositions were badly fouled. These tests confirm the popular view of experts that zinc oxide is insufficiently toxic by itself to inhibit marine fouling despite high levels of zinc ions produced by the corrosion of metallic zinc in the presence of saltwater. This suggests that the mechanism is not directly related to the known algicidal properties of zinc-containing compositions (e.g., U.S. Pat. No. 3,507,676 (McMahon) issued Apr. 21, 1970.). Since the compositions of EXAMPLE 1 contain neither small amounts of heavy metals (e.g., copper, tin or lead) nor broad spectrum organic toxicants, the toxicity of the coatings of the invention must come from other source(s).

One possible mechanism for the surprising behavior illustrated in EXAMPLE 1 is the formation on the coating surface of oxidizing species due to the presence of oxygen, photocatalysts and light. To explore this possibility, the following laboratory control experiments were performed.

Into a 50 mL beaker was charged 5 grams of wood rosin, 12 grams of xylene, 14 grams of methyl isobutyl ketone and 4 grams of vinyl resin (VROH grade, Union Carbide, Houston, Tex.). The mixture was stirred at ambient temperature until a coating vehicle was obtained. According to this invention, 10 grams of zinc oxide pigment (USP-1 grade, representing about 22 wt % of the composition) as well as 1 gram of zinc pyrithione powder (representing about 2 wt % of the photosensitizer) was then admixed into the coating vehicle and the mixture was thoroughly stirred until homogeneous. Said coating composition was then applied to two identical Plexiglas cylinders which were 2.5 inches in diameter by 6 inches long. In both cases, the coatings were applied to the cylinders in a band that covered 200 sq. cm. of surface. The coated cylinders were allowed to air dry for 48 hours before testing. Each cylinder was placed in a separate polycarbonate tank containing 1.5 L of synthetic seawater (ASTM D1141) at room temperature. One tank was continuously aerated by means of an electric air pump connected to a bubbler placed in the synthetic seawater, while the second tank was covered to seal it from the air atmosphere. In this way, one cylinder served as a nonaerated control.

Both transparent tank lids were illuminated with the same 100 Watt incandescent light bulb. Both illuminated coatings were kept under the synthetic seawater. Aliquots of the test solutions were periodically taken and tested for the presence of peroxides by titration with a standard potassium permanganate solution. Control tests were used to correct for the presence of dissolved materials in the synthetic seawater that could give false positive peroxide readings. Peroxide concentration measurements were performed after 48, 72 and 200 hours of immersion as shown below:

| Time (hours) | Unaerated test $H_2O_2$ (ppm) | Aerated test $H_2O_2$ (ppm) |
|---|---|---|
| 0 | 0.0 | 0.0 |
| 48 | 0.0 | 0.4 |

-continued

| Time (hours) | Unaerated test $H_2O_2$ (ppm) | Aerated test $H_2O_2$ (ppm) |
|---|---|---|
| 72 | 0.0 | 0.4 |
| 200 | 0.0 | 1.4 |

These results indicate that the peroxide content of the aerated test solution continues to increase with time, whereas the control without additions of dissolved oxygen generates no measurable peroxide over the same time period. The aerated and the unaerated tanks were then covered with aluminum foil to block out all light. No peroxide generation was observed when the coating was kept in the dark irrespective of the presence or absence of oxygen.

These tests demonstrate that the invention generates peroxides and that both light and oxygen are required. Hydrogen peroxide alone or when combined with ferrous salts has been shown (Katayama, Yasunaga, and Wakao; Marine Biology, 99, 145–150, 1988 and U.S. Pat. No. 4,440,611 (Dhar) issued Apr. 3, 1984) to be a very effective means for preventing attachment of aquatic organisms to surfaces. Therefore, it may be that the surprising and unexpected antifouling behavior of the invention is to some extent due to visible-light-induced generation of peroxide species.

EXAMPLE 3

Photosensitizers are typically much more expensive per pound than zinc oxide. Since the role of the photosensitizers may be catalytic rather than chemical, the possibility of producing toxic surfaces with very low levels of photosensitizers in combination with more than 20 wt % levels of zinc oxide was explored. In the same manner as described in EXAMPLE 2, the solvent-based coating vehicle was prepared and it was used to prepare compositions according to the invention containing 22 wt % ZnO and only 0.01 wt % hypericin. In order to insure uniform coating of the zinc oxide pigment, the hypericin was first dissolved in acetone and the zinc oxide washed with this acetone solution. After the acetone had evaporated, the hypericin-coated zinc oxide powder was admixed in the coating vehicle. Said composition were then applied to two pairs of Plexiglas test cylinders to determine the relative peroxide generating capabilities of the dried coatings in the presence and absence of light and air. One cylinder was used as the test cylinder, the second as a control. Peroxide generation was observed only when both light and air were present. The peroxide levels in both light and air depended on the exposure time to artificial light as illustrated in the table below. As controls, pigments which are known to catalyze the decomposition of hydrogen peroxide (1 wt % cobalt phthalocyanine or zinc phthalocyanine) were substituted for the hypericin. As an additional control, zinc oxide was left out of the hypericin composition.

| Photoactive Pigment | Incubation Time (hrs.) | Peroxide, (ppm) |
|---|---|---|
| CoPc | 96 | 0.0 |
| ZnPc | 100 | 0.0 |
| Hypericin & ZnO | 120 | 1.7 |
| Hypericin w/o ZnO | 120 | 0.0 |

These results illustrate that the combination of zinc oxide and photosensitizer(s) produces peroxide levels lethal to bacteria even though the components under these conditions do not. Furthermore, only very small levels of hypericin are needed to produce high levels of peroxides in the presence of zinc oxide, light, water and oxygen. These four compositions were painted over four 6" by 24" sections of a common fiberglass test panel separated by a one inch unpainted border. After air drying at room temperature for two days, this test panel was immersed in the ocean in Jupiter, Florida vertically at a depth of three feet. After eight months of exposure, this test panel was completely fouled except for the 6" by 24" panel painted according to the invention with zinc oxide and hypericin. This section was completely free of marine fouling.

EXAMPLE 4

For optimum antifouling results, the level of zinc oxide in the coating composition should be maintained above a minimum level. In order to experimentally determine this level, a series of coating compositions were prepared in which the zinc oxide content plus inert filler was maintained at 42 wt %. The rest of said compositions was 1 wt % zinc pyrithione (the photosensitizer), 11 wt % gum rosin (WW Grade), 7 wt % vinyl resin (VYHH, Union Carbide Corp., Houston, Tex.), 11.5 wt % MIBK, 26 wt % xylene, and 1.5 wt % dioctyl phthlate. Three separate coatings were then prepared from this basic vehicle in which the zinc oxide and rutile titanium oxide pigment (Ti-Pure, DuPont Corporation, Wilmington, Del.) content were varied as shown in the following table.

| Coating | Zinc Oxide Content (wt %) | Ti-Pure Content (wt %) |
|---|---|---|
| 1 | 30 | 12 |
| 2 | 24 | 18 |
| 3 | 12 | 30 |

Unlike the anatase form of titanium dioxide illustrated in EXAMPLE 1, the rutile form used in this example shows little photoactivity for visible light. To reduce the photoactivity still further, Ti-Pure is coated by the manufacturer with oxides such as alumina, zirconia and silica which help destroy the photocatalytic effect. Thus Ti-Pure acts like an inert filler for the purposes of these tests.

The resulting formulations were applied to individual 6 in by 24 in sections of a common fiberglass panel separated by a one inch uncoated strip and allowed to air dry at ambient temperature for two days. The dry coating thickness was approximately 0.5 millimeters. All of the coatings appeared to have an even beige color upon drying. Said coated panel was immersed in the ocean at New Bedford, Mass. from a stationary platform during the summer. These coatings were periodically inspected to determine the type and degree of marine biofouling. After two months of immersion, Coatings 1 and 2 were completely clean while Coating 3 had a thin layer of algae with 3 or 4 medium size barnacles firmly attached.

These results show that at a minimum the zinc oxide content of an effective coating should be more than about 20 wt %.

In addition to being used in paints, zinc oxide particles coated in accordance with the present invention can be used as an additive in household and commercial cleaners such that a film is left on the surface being cleaned after the surface dries that prevents bacterial or other unwanted organic growth. Thus, for example, into any commercially known powdered cleaner of the type normally used to clean kitchen counters, bath tubs and the like up to as much as about 20% by weight zinc coated particles may be included in the cleaner. Since the zinc oxide does not readily dissolve in water, it can leave a thin film on the cleaned surface after drying that prevents bacterial growth.

The coated particles can also be used in spray cleaners where the particles are present in the cleaner as a colloid which is then dispersed on the surface to be cleaned upon spraying.

While the above is illustrative of what is now contemplated to be the best mode of carrying out the present invention, the compositions for preventing or retarding biological fouling are subject to modification without departing from the spirit and scope of the invention. For example, the photosensitizer may be produced from many materials, for those skilled in the art may easily measure water insolubility, toxicity, light fastness, light absorbance as a function of wavelength, and increased peroxide generation in the presence of light, water, oxygen and zinc oxide. Therefore, the invention is not restricted to the particular photosensitizers illustrated and described, but covers all modifications which may fall within the scope of the following claims. It is the applicants' intention in the following claims to cover such modifications and variations as fall within the true spirit and scope of the invention.

What is claimed is:

1. A material useful for producing antifouling activity when incorporated into a carrier comprising:

about between 20 wt. % and 60 wt. % of the total material weight of zinc oxide containing less than about 0.001% by weight of lead, cadmium and sulphur oxides and being obtained from colloidal zinc oxide so as to have a mean particle size of between 0.1 to 0.5 microns and a surface area between 1 to 10 square meters per gram;

a photosensitizer in photoelectric contact with zinc oxide and being present in a ratio of one part by weight or less of photosensitizer to four parts by weight zinc oxide, said photosensitizer having a solubility below five parts per million by weight in water and wherein said photosensitizer is contacted by said zinc oxide and is selected from the group consisting of fumed anatase, strontium titanate, bianthrone, azulene, zinc pyrithione, terthiophene, hypericin and mixtures thereof.

2. An antifouling paint composition comprising:

paint, said paint containing zinc oxide in an amount of about between 20 wt. % and 60 wt. % of the total composition weight and having a mean particle size of about between 0.1 to 0.5 microns and a surface area of about between 1 to 10 square meters per gram and contacted with a photosensitizer selected from the group consisting of fumed anatase, strontium titanate, bianthrone, azulene, zinc pyrithione, terthiophene, hypericin and mixtures thereof.

3. The composition of claim 2, wherein said paint comprises polyvinyl, polyalkyd, polyepoxide, polysiloxane, polyurethane, polyacrylonitrile, polyacrylate, or polyester resins, and combinations thereof.

4. The composition of claim 2 wherein said paint comprises a liquid diluent and alkali silicates selected from the group consisting of sodium silicate, potassium silicate, quaternary ammonium silicate, ammonium silicate and mixtures thereof.

5. The composition of claim 2 wherein said paint includes water.

6. The composition of claim 2 wherein the photosensitizer is substantially insoluble in water, absorbs wavelengths between about 400 nm and about 700 nm and, when contacted with said zinc oxide, water, oxygen and said light, catalyzes the photoproduction of effective concentrations of peroxide ions.

7. The composition of claim 2 wherein said photosensitizer is zinc oxide contacted with one or more peroxide-generating photosensitizers.

8. The composition of claim 2, wherein said photosensitizer is in an amount of about 0.01 to about 5 wt % of the total weight of said antifouling paint composition and said paint is in the amount of about 40 to about 75 wt % of the total composition weight.

9. A method of protecting a surface comprising coating said surface with an antifouling paint composition comprising about 40 to about 75 wt % paint, about 20 to about 60 wt % of the total composition weight of zinc oxide having a mean particle size of about between 0.1 and 0.5 microns and a surface area of about between 1 to 10 square meters per gram, and about 0.01 to about 5 wt % of the total composition weight of a photosensitizer which is contacted with said zinc oxide and is selected from the group consisting of fumed anatase, strontium titanate, bianthrone, azulene, zinc pyrithione, terthiophene and hypericin and mixtures thereof.

10. The method of claim 9 wherein said surface includes boat bottoms, masonry, conduits, shower curtains, fish nets, hospital walls and roofs.

11. A method of preventing unwanted organic growth on a surface comprising:

treating the surface with a composition containing 20–60 wt. % of the total composition weight of zinc oxide containing less than about 0.001% by weight of lead, cadmium and sulphur oxides and being obtained from colloidal zinc oxide so as to have a mean particle size of between 0.1 to 0.5 microns and a surface area between 1 to 10 square meters per gram; and about 5 wt. % of the total composition weight of a photosensitizer, wherein the photosensitizer is an inorganic pigment which is contacted with said zinc oxide and is selected from the group consisting of anatase, strontium titanate and mixtures thereof.

12. The method of claim 11 including the step of adding more than one photosensitizer to the composition.

13. A method of preventing unwanted organic growth on a surface comprising:

treating the surface with a composition containing 20–60 wt. % of the total composition weight of zinc oxide containing less than about 0.001% by weight of lead, cadmium and sulphur oxides and being obtained from colloidal zinc oxide so as to have a mean particle size of between 0.1 to 0.5 microns and a surface area between 1 to 10 square meters per gram; and about 5 wt. % of the total composition weight of a photosensitizer which contacts said zinc oxide, wherein the photosensitizer is an organic pigment selected from the group consisting of hypericin, azulene, and porphyrinatozinc and mixtures thereof.

14. The method of claim 13 including the step of mixing said photosensitizer and said zinc oxide in solution to contact said photosensitizer with said zinc oxide.

15. The composition of claim 1 wherein said photosensitizer is contacted with said zinc oxide by mixing said photosensitizer and said zinc oxide in solution.

16. The method of claim 9 including the step of mixing said photosensitizer and said zinc oxide in solution to contact said photosensitizer with said zinc oxide.

17. The method of claim 11 including the step of mixing said photosensitizer and said zinc oxide in solution to contact said photosensitizer with said zinc oxide.

* * * * *